Figure 1:
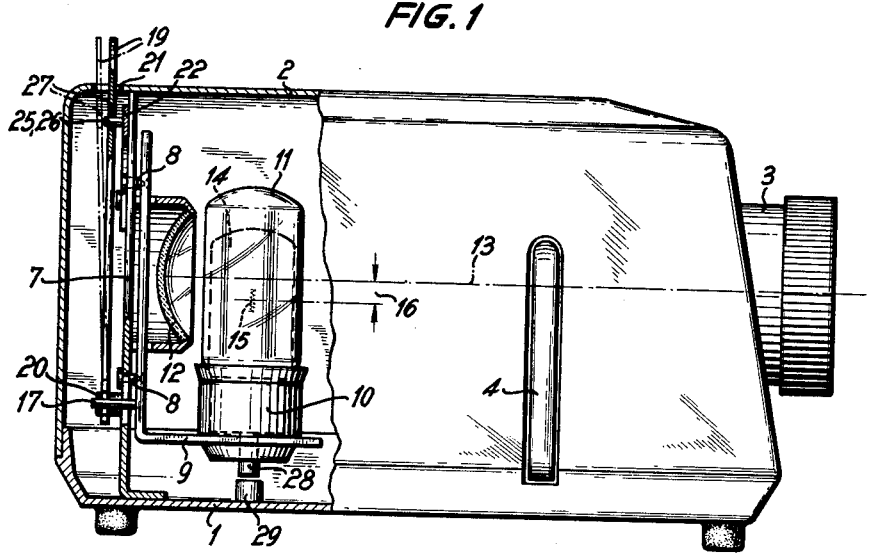

Nov. 17, 1964     E. ZILLMER     3,157,088
SLIDE PROJECTOR WITH COMBINED LAMP ADJUSTING AND EJECTING MEANS
Filed Oct. 12, 1962

INVENTOR
Erich Zillmer
By Blum, Moscovitz,
Friedman and Blum
Attorneys

United States Patent Office 3,157,088
Patented Nov. 17, 1964

3,157,088
SLIDE PROJECTOR WITH COMBINED LAMP ADJUSTING AND EJECTING MEANS
Erich Zillmer, Braunschweig, Germany, assignor to Voigtlander A.G., Braunschweig, Germany, a corporation of Germany
Filed Oct. 12, 1962, Ser. No. 230,185
Claims priority, application Germany, Oct. 27, 1961, Z 9,034
9 Claims. (Cl. 88—24)

This invention relates to slide projectors equipped with means for ejecting a projector lamp from its socket and, more particularly, to a novel single operating means capable of adjusting a lamp, in its socket, relative to the optical axis of the projector as well as capable of effecting ejection of the lamp from its socket.

Many slide projectors are provided with means whereby the lamp bulb may be mechanically ejected from its socket, thereby providing for ready interchangeability of lamp bulbs without the necessity of the operator manipulating the bulbs which become highly heated during use, to disengage it from its socket.

Another problem encountered in the use of slide projectors is that of properly centering the filament of the projector lamp relative to the optical axis of the projector. This problem arises due to the fact that lamps of different ratings have their filaments located at different distances from the lamp base, and thus some means must be provided whereby the lamp socket, carrying the lamp, may be adjustable or positionable in such manner that the filament of the lamp can be centered relative to the optical axis. Arrangements have been proposed for adjusting a lamp bulb, or its socket, relative to the optical axis of the projector, but have been unduly complicated and expensive.

It has also been proposed to provide mechanical means, operating on the usual centering base pin of a lamp, to move the lamp upwardly out of its socket so that it may be readily disengaged from the socket without undue effort. However, the provision of separate means for adjusting a lamp relative to the optical axis in addition to separate means for ejecting a lamp from its socket has resulted in undue complications of the projector. This militates against one objective in the manufacture and use of slide projectors, which has been to make these projectors so simple that they can be readily used by an untrained operator without fear of derangement of the projector.

An object of the present invention is to provide a combined lamp adjuster and ejector for a slide projector, both the adjustment of the lamp relative to the optical axis of the projector and the ejection of the lamp from its socket being effected by the same single means having an operating handle or manipulating end projecting outwardly of the projector housing.

To this end, the housing for the projector is provided with means for mounting a lamp socket for reciprocal adjustment relative to the optical axis of the projector, which is determined by the optical axis of the projector objective. The socket is mounted for reciprocation at right angles to the objective axis, and a suitable operating means, such as a lever, is swingably mounted in the projector housing. This operating means has a manipulating end projecting outside the housing and an operating end effectively coupled with the socket. By manipulation of this operating means, the lamp socket may be adjusted in a manner to center the filament of the lamp on the optical axis of the objective.

For ejection of the lamp, the projector is provided with abutment means aligned with the usual ejecting pin on the base of the lamp, and which pin projects through an aperture in the socket base, such alignment being in the direction of reciprocation of the lamp socket. During normal adjustment of the lamp relative to the optical axis by the operating means, the arrangement of parts is such that the abutment means does not engage the base pin of the projector lamp. However, upon movement of the operating means toward its limit of reciprocation in one direction, the socket is moved so close to the abutment means that the latter will engage the base pin of the lamp and will push the lamp upwardly out of the socket.

Figure 2:
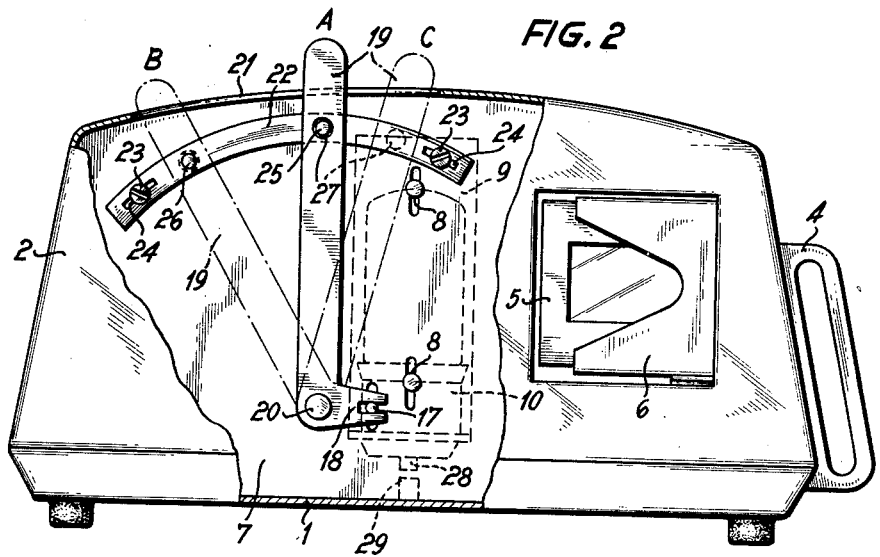

For an understanding of the principles of the invention, reference is made to the following description of a typical embodiment thereof as illustrated in the accompanying drawings. In the drawings:

FIG. 1 is a side elevational view, partly broken away, of a slide projector embodying the invention; and FIG. 2 is a rear elevational view, partly broken away, of the slide projector shown in FIG. 1.

Referring to FIGS. 1 and 2, the projector housing is illustrated as including a base 1 and a removable hood 2. An objective lens 3 projects forwardly from the projector housing, and the optical axis of the objective 3 determines the optical axis of the projector. In a known manner, the projector is provided with a slide shifter 4 by means of which slides 5 may be shifted between a rack or magazine 6 and a support position intersecting the optical axis.

In accordance with the invention, the projector is provided with a partition 7 spaced inwardly from the rear wall thereof, and preferably secured to the base 1. Partition 7 is formed with vertically elongated, aligned and spaced slots receiving projecting pins 8 on a bracket 9 carrying a lamp socket 10 for the projection lamp. As best seen in FIG. 1, a projector lamp 11, having a high rating and relatively large size, is indicated in solid lines in the position in which its filament is centered on the optical axis 13 of the projector. This optical axis is determined by the optical axis of the objective 3 in cooperation with the optical axis of the reflector 12. A projector lamp 14, of a lower rating and smaller size, is illustrated in dotted lines in FIG. 1 as if it were mounted in the socket 10 in the position which the latter occupies when the lamp 11 is properly centered on the objective axis 13. It will be noted that, in this position, the filament 15 of the lamp 14 is located a distance 16 below the optical axis so that, when a lamp 14 is used, the socket 10 must be raised until the filament 15 is centered on the optical axis 13. This may be done by moving the socket 10 upwardly, due to its mounting on the slide 9 which is mounted for vertical reciprocation upon the partition 7 through the medium of the pins 8 engaged in the vertically elongated, aligned, and spaced slots in the partition 7.

In further accordance with the invention, the bracket 9 is provided with a pin 17 which projects through a vertically extending slot toward the lower portion of the partition 7. A bearing or pivot 20 secured to the partition 7 pivotally supports an angle lever 19 which has a relatively short forked armed or operating end 18 engaged with the pin 17. The free of manipulating end of the lever 19 projects through an opening 21 in the housing 2.

Extending through the range of oscillation of the lever 19, there is a segmental guide 22 having slots 24 which adjustably receive screws 23 securing the segmental guide to the partition 7 so that guide 22 may be adjusted relative to this partition. At spaced positions therealong, the guide 22 is provided with projecting pins 25 and 26 selectively engageable in an aperture 27 in the lever 19. Thus, the lamp socket 10 may be locked in either one of two selected positions. It may be stated that, by virtue of the adjustable mounting of the guide 22, these two pins 25 and 26 can be so positioned that, when lever 19 is locked to either one thereof, one or the other of a pair of lamps of different ratings will have its filament accurately centered on the optical axis 13. In FIG. 1, the dotted line position of the lever 19 indicates how the lever may be disengaged from the pins 25 or 26, due to the resilience or flexibility of the lever.

The position which lever 19 occupies when the lamp 11 has its filament centered on the optical axis 13 is designated "A" in FIG. 2, and the position which the lever 19 occupies when the filament 15 of the lamp 14 is centered on the optical axis 13 is designated "B," this being a dotted line position. It will be noted that the lever 19 is movable to a further position "C" indicated in broken lines in FIG. 2. This position "C" is not a locking position for the lever 19.

Each of the lamps arranged for mounting in the socket 10 is formed with a pin 28 projecting from its base and extendible through a suitable aperture in the base or bottom of the socket 10. In alignment with the pins 28, an abutment 29 is provided on the base 1 of the projector and, in the position "A" of the lever 19, this abutment 29 is spaced somewhat from the projecting pin 28 of a lamp. However, upon movement of the lever 19 to the position "C," the pin 28 is brought into engagement with the abutment means 29 and the abutment means 29 causes the pin 28, and thus the lamp base and lamp, to move upwardly in the socket 10 to disengage the lamp from its socket. The amount of the disengagement is such that the lamp may then be lifted easily from the socket 10 without any difficulty. Thus, it will be seen that the structure of the invention includes a means in the housing which mounts the socket 10, not only for reciprocation through a lamp adjusting range but also for additional movement through an ejecting range beyond the lamp adjusting range, this movement of the lamp socket 10 through the additional ejecting range bringing the pin 28 down into engagement with the abutment means 29 for displacing the lamp out of the socket 10.

From the foregoing description, it will be clear that the invention provides a combination lamp adjusting and ejecting means involving a single operating means which is simply constructed and simply assembled with the slide projector.

While a specific embodiment of the invention has been shown in detail to illustrate the application of the principles of the invention, it will be understood that the invention may be embodied otherwise without departing from such principles.

What is claimed is:

1. In a slide projector having a housing and an objective defining the optical axis of the projector, and constructed for use with a lamp having a locating pin projecting downwardly from its base: the combination comprising a lamp socket having a base apertured for projection of the lamp pin therethrough; means in said housing mounting said socket for reciprocation through a lamp adjusting range, for adjustment of a lamp mounted therein relative to said optical axis, and through an ejecting range beyond said lamp adjusting range; lamp ejecting abutment means in said housing aligned with the pin along the line of reciprocation of said socket; and operating means movably mounted on said housing and having a manipulating end projecting from said housing and an operating end coupled to said socket, to reciprocate said socket to effect adjustment of a lamp mounted therein in said lamp adjusting range; said abutment means, upon a predetermined movement of said socket through said ejecting range toward said abutment means by said operating means, engaging the pin of a lamp mounted in said socket to eject the lamp from said socket so that said pin also acts as an ejecting pin.

2. In a slide projector, the combination claimed in claim 1, in which said socket is arranged to receive lamps of different ratings and sizes and having filaments located at correspondingly different distances from the lamp bases; and releasable latch means along the path of movement of the manipulating end of said operating means to releasably latch the latter in selected positions each corresponding to a position in which the filament of a lamp of a respective rating is centered with respect to said optical axis; said operating means being movable beyond the range of said releasable latch means when manipulated to eject a lamp from said socket.

3. In a slide projector, the combination claimed in claim 2, including a member fixedly supporting said releasable latch means in spaced relation to each other along such path; and means adjustably mounting said member on said housing whereby the position of said releasable latch means, relative to said operating means, may be adjusted bodily to pre-set said adjustable latch means at the proper locations for centering of a lamp filament.

4. In a slide projector, the combination claimed in claim 1, in which said mounting means comprises a partition in said housing, having vertically elongated aligned and spaced slots, and a mounting bracket for said socket having pins engaged in said slots for vertical adjustment of said socket relative to the optical axis of the projector.

5. In a slide projector, the combination claimed in claim 4, in which said operating means comprises an angular lever pivotally mounted on said partition and having an operating end coupled to said bracket and a manipulating end extending outwardly through an opening in the projector housing.

6. In a slide projector, the combination claimed in claim 5, including a segmental guide cooperable with the manipulating arm of said lever; said guide having a pair of spaced locking pins thereon each alignable with the manipulating end of said lever when a lamp having a respective rateing has its filament centered on said optical axis; the manipulating end of said lever having an aperture therein for receiving one of said pins, and being of sufficient resilience for disengagement from the pin.

7. In a slide projector, the combination claimed in claim 6, including means adjustably mounting said segmental guide on said housing for initial adjustment thereof to properly position said pins with respect to such centered position of the lamp filaments.

8. In a slide projector, the combination claimed in claim 7, in which said abutment means comprises an abutment in the projector housing aligned with the ejecting pin on a lamp; the manipulating end of said lever being movable along said guide beyond a terminal locking pin in one direction of movement to engage said abutment with the ejecting pin of a lamp mounted in said socket to eject the lamp from the socket.

9. In a slide projector, the combination claimed in claim 8, in which the operating end of said lever is a forked lever arm and is engaged with a pin projecting from said socket mounting bracket.

References Cited in the file of this patent

UNITED STATES PATENTS

| 1,631,529 | Hill | June 7, 1927 |
| 1,642,919 | Cloughley | Sept. 20, 1927 |
| 1,884,603 | Dina | Oct. 25, 1932 |
| 2,738,476 | Buquor | Mar. 13, 1956 |